C. T. HENDERSON.
MOTOR CONTROLLING SYSTEM.
APPLICATION FILED MAR. 14, 1907.
903,288.
Patented Nov. 10, 1908.
2 SHEETS—SHEET 1.
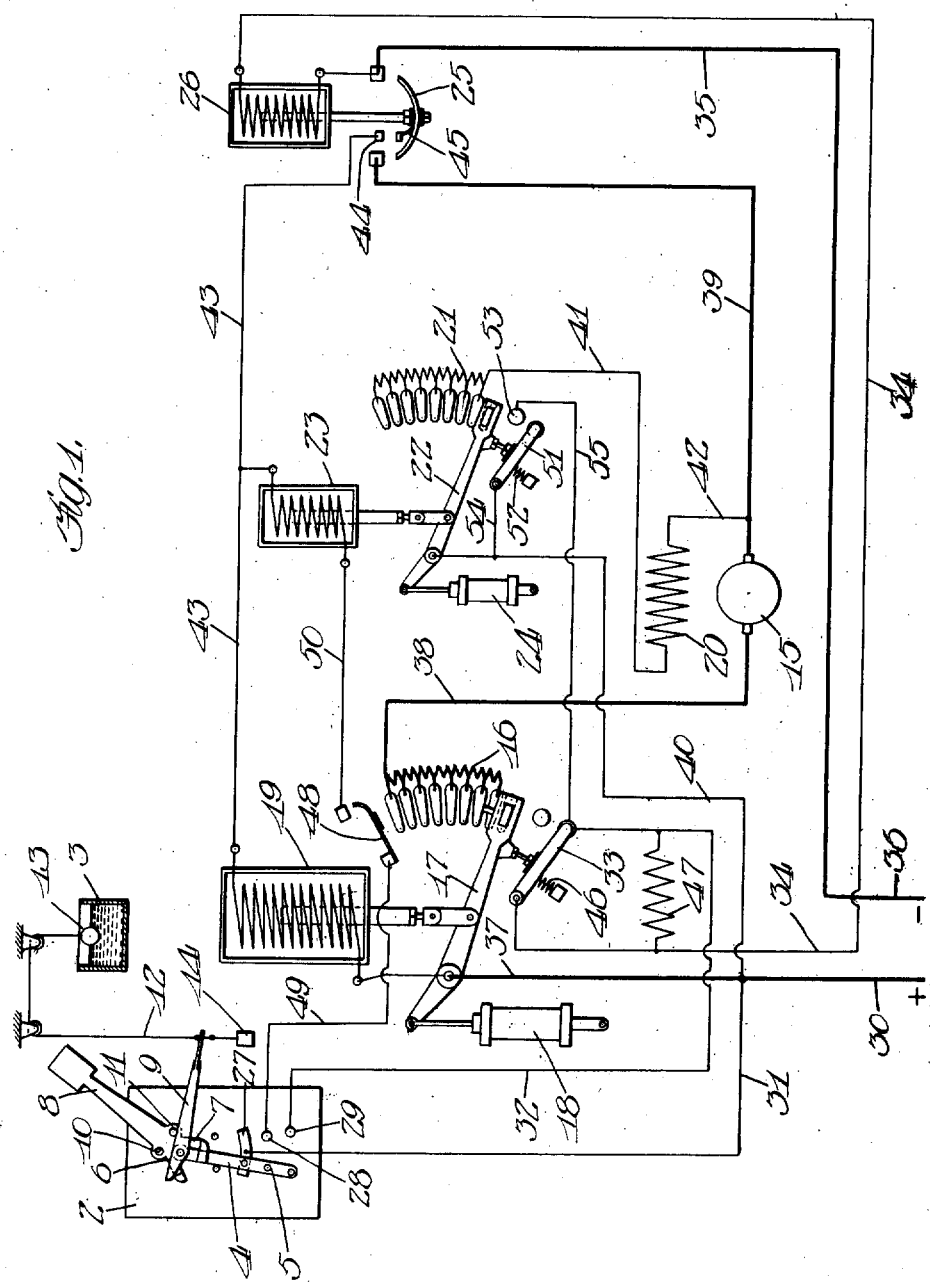
WITNESSES:
Robert H. Weir
W. Perry Hahn
INVENTOR
Clark T. Henderson
BY
Edwin B. H. Tower, Jr.
ATTORNEY.

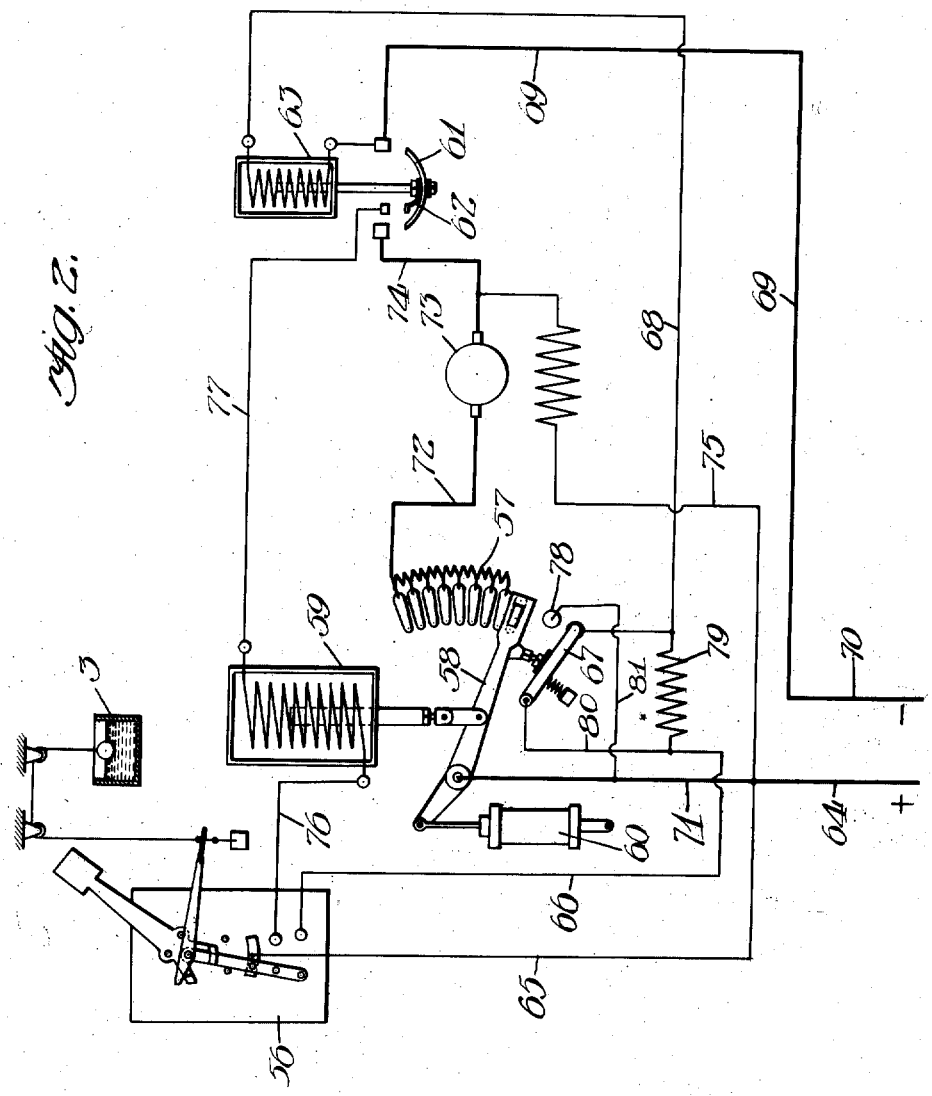

UNITED STATES PATENT OFFICE.

CLARK T. HENDERSON, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

MOTOR-CONTROLLING SYSTEM.

No. 903,288.         Specification of Letters Patent.         Patented Nov. 10, 1908.

Application filed March 14, 1907. Serial No. 362,385.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Controlling Systems, of which the following is a full, clear, concise, and exact description, reference being had to the accompanying drawing, forming a part of this specification.

My invention relates to improvements in systems for automatically controlling electric motors and has particular reference to improvements in systems for automatically controlling electric motors adapted to operate centrifugal or turbine pumps and the like.

By my improved system the motor is automatically started and stopped under predetermined conditions. As soon as the pressure on the volume of water has been increased to the proper amount, the motor is automatically stopped.

My invention also provides for automatically slowing down the speed of the motor before it comes to a stop. This feature is especially advantageous under certain conditions where the motors operate a pump acting against a certain head of water. Under these conditions ordinarily, when the power is suddenly shut off from the motor driving the pump, the head of water above the check valve will settle back on the valve with a destructive hammer blow. By automatically slowing down the speed of the motor this hammer blow is avoided.

For the purpose of disclosing my invention I have illustrated in the accompanying drawings, systems embodying the features thereof.

Figure 1 shows a diagrammatic view of the circuit arrangement of a system in which the field strength of the motor is automatically increased to slow down the speed of the motor, and Fig. 2 shows a diagrammatic view of the circuit arrangement of the system in which the armature resistance is automatically increased to slow down the speed of the motor.

Referring to Fig. 1, I provide a switch 2, actuated by a float in the tank 3, for controlling the operation of the motor. This switch comprises an arm 4 pivoted upon a suitable base, and having arranged thereon bridging contacts 5. The arm is arranged to be engaged by the bifurcated ends 6 and 7 of a weighted lever 8, which in turn is operated by a lever 9 arranged to engage pins 10 and 11 formed on the lever 8 and moved by the connection 12 with the float 13 in the tank 3. This connection may be in the form of a chain having at one end thereof a weight 14 arranged to counterbalance the weight of the float 13 and connected to the end of the lever 9. In operation, as the water falls in the tank 3, the end of the lever 9 will be raised and through its engagement of the pin 11, will move the weighted lever to the left. As soon as the lever passes its center the weight will throw it to its extreme opposite position, and the arm 6 will engage the lever 4, snapping the same over to bridge the contacts of the switch. By this construction I am enabled to obtain a quick make and break between the contacts of the switch.

The armature 15 of the motor has included in the circuit thereof, a resistance 16 controlled by the arm 17. The speed at which the arm moves is controlled by a dashpot 18 which is so constructed that it retards the movement of the arm in both directions. The arm 17 is operated by a solenoid 19. The field 20 of the motor has included in the circuit thereof, a resistance 21 controlled by the movable arm 22. The arm 22 is operated by a solenoid 23 and is controlled in its movement by a dash-pot 24. The motor circuit is controlled by a switch 25 operated by a solenoid 26.

In operation, assuming that the water in the tank 3 has fallen below a predetermined level, then the arm 9 will be raised and throw the arm 8 past its center, when it will by gravity quickly move to its extreme opposite position, and the bifurcation 6 will engage the arm 4, snapping it over until the bridging contacts 5 bridge the contacts 27, 28 and 29. The closing of the float switch closes a circuit from the positive line 30 through the conductor 31, the float switch 4, conductor 32, switch 33, conductor 34, winding of the solenoid 26, conductor 35, to the negative side 36 of the line. The solenoid 26 then closes the switch 25, which completes the armature circuit of the motor from the positive side 30, of the line, through conductor 37, arm 17, resistance 16, conductor 38, armature 15, switch 25, conductor 35, and back to the negative side 36 of the line. The field circuit for the motor is also closed from conductor 30, conductor 40, arm 22, conductor 41, field 20, conductor 42, conductor 39, across switch 25, and by conductor 35 to the negative side 36 of the line. At the same time circuit is also closed from the contact arm 17, through a winding of the solenoid 19, by conductor 43, to contact 44, across the auxiliary contact 45, carried on switch 25, and thence by conductor 35, to the negative side of the line. The solenoid 19, being energized, raises the arm 17 and gradually cuts out the resistance 16 from the armature circuit, causing the motor to build up in speed. When the arm 17 rises, the switch 33 is permitted to open under the action of the coiled spring 46, thereby inserting resistance 47 in series with the winding of the magnet 26. This resistance cuts down the strength of the solenoid 26 to such a degree that while it will maintain the switch 25 in its closed position, it is not of sufficient strength to close the switch in event it drops, it being understood that it requires a greater energy to close the switch than to retain it in position after it has once been closed.

When the arm 17 reaches its full "on" position, cutting out all of the resistance 16 from the armature circuit, it closes a switch 48, which completes a circuit from the positive side 30 of the line, through conductor 31, across the float switch 4, by conductor 49, across the switch 48, conductor 50, through the winding of the solenoid 23, by conductor 43, across the switch 45, and by conductor 35, to the negative side 36 of the line. The solenoid 23 thus being energized, raises the arm 22, inserting the resistance 21 in the field circuit to decrease the strength of the field, and thereby increase the speed of the motor.

When the contact arm 22 is raised it permits the switch 51 to be moved by the coiled spring 52, and engage the contact 53, thereby partially short circuiting the float switch 4. In consequence when the water in the tank 3 is raised to its proper level, and the float switch 4 is opened, the solenoid 26 remains energized through a circuit extending from the positive side 30 of the line, by conductor 40, conductor 54, switch 51, conductor 55, resistance 47, conductor 34, winding of the solenoid 26, and by conductor 35, back to the negative side 36 of the line.

When the float switch 4 is opened, by the rising of the water in the tank 3, the circuit through the winding of the solenoid 23 is opened, permitting the arm 22 to descend and gradually cut out the resistance in the field circuit to slow down the speed of the motor. When the arm 22 reaches its lowermost position, it opens the switch 51, opening the circuit through the winding of the solenoid 26, which in turn permits the switch 25 to open and stop the motor.

In Fig. 2, I have illustrated a system in which the elements are so arranged that instead of initially slowing the speed of the motor down by cutting out a field resistance, the armature resistance will be gradually increased to slow the motor down to a low speed when the current is cut off. In this system I have eliminated the resistance in the field circuit and control the speed of the motor entirely through the armature resistance. In the modification illustrated in Fig. 2, a float switch 56 of the same construction as illustrated in Fig. 1 is provided, and the armature resistance 57 of the motor is controlled by an arm 58, operated by a solenoid 59. The speed at which the arm 58 operates is controlled by a dash-pot 60, which is so constructed that it retards the movement of the arm in both directions. A switch 61, having an auxiliary contact 62, controls the motor circuit and is operated by a solenoid 63.

In operation, assuming that the water in the tank 3 falls below a predetermined point, then the switch 56 will be closed, establishing a circuit from the positive side 64 of the line, by conductor 65, across the float switch, by conductor 66, switch 67, conductor 68, through the winding of the solenoid 63 and by conductor 69, to the negative side 70 of the line. The solenoid 63 is thus energized and closes the switch 61 and the auxiliary switch 62. The closing of the switch 61 establishes the armature circuit of the motor from the positive side of the line, by conductor 71, arm 58, resistance 57, conductor 72, armature 73 of the motor, conductor 74, switch 61, and by conductor 69 to the negative side 70 of the line. The field winding of the motor is connected by conductor 75 between the conductors 64 and 74. At the same time that the motor circuit is established by the closing of the switch 62, the circuit of the winding of the solenoid 59 is closed from conductor 65, across the float switch 56, by conductor 76, through the winding of the solenoid 59, by conductor 77, across auxiliary switch 62, and by conductor 69, to the negative side 70 of the line. The solenoid 59 thus energized raises the arm 58 and gradually cuts out the resistance 57 from the armature circuit. As soon as the arm 58 leaves the first of the resistance contacts, the switch 67 engages the contact 78, thereby placing the resistance 79 in series with the solenoid 63, and at the same time partially short circuiting the float switch 56, by establishing a circuit from the main 64, by conductors 71 and 81, across the switch 67, by conductor 80, through resistance 79, by conductor 68, through the winding of the solenoid 63, and thence by conductor 69, to the negative side 70 of the line. In consequence when the water in the tank 3 has been raised to its proper level, thereby opening the switch 56, the solenoid 63 will remain energized, and keep the motor circuit closed until the arm 58 descends to its normal position and opens the switch 67. The descent of the arm 58 is retarded by the dash-pot 60 whereby, as the arm descends, the resistance 57 will be slowly inserted in the armature circuit, and the speed of the motor will gradually be diminished.

For the purpose of disclosing the operation of my system, I have described the same in connection with a motor for operating a pump, and have shown a float switch for controlling the operation of the motor. It will be understood, however, that I do not wish to be limited to the specific construction set forth, and that various modifications may be used without departing from the spirit of my invention, as for instance a pressure gage may be used in place of a float switch or any other switch mechanism may be used, if so desired.

Having thus described my invention what I claim as new and desire to secure by Letters Patent is:

1. In a motor controlling system, the combination with a resistance, of a controlling member therefor, an electromagnetic winding for operating said member, a main switch, an electromagnetic winding for operating said switch, a switch operated upon the closure of said main switch for closing the circuit of said first mentioned winding, a pressure operated switch adapted, when in one position, to close the circuit of said second mentioned winding and in another position to deënergize said first mentioned winding, and means for maintaining said second mentioned winding energized until said resistance controlling member reaches a predetermined position.

2. In a motor controlling system, the combination with a resistance, of a controlling member therefor, an electromagnetic winding for operating said member, a main switch, an electromagnetic winding for operating said switch, a switch operated upon the closure of said main switch for closing the circuit of said first mentioned winding, a pressure operated switch adapted, when in one position, to close the circuit of said second mentioned winding and in another position to deënergize said first mentioned winding, means for maintaining said second mentioned winding energized until said controlling member reaches a predetermined position and means necessitating said member being in a predetermined position, prior to the closure of said main switch.

3. In a motor controlling system, the combination with a resistance, of a controlling member therefor, an electromagnetic winding for operating said member, a main switch, an electromagnetic winding for operating said switch, a switch operated upon the closure of said switch for closing the circuit of said first mentioned winding, a pressure operated switch adapted, when in one position, to close the circuit of said second mentioned winding and in another position to deënergize said first mentioned winding, a resistance arranged to be connected in circuit with said second mentioned winding for rendering the same inoperative to close said main switch, a shunt circuit around said pressure operated switch for maintaining said second mentioned winding energized, and means tending to close said shunt circuit and insert said resistance in circuit, said means being arranged to be automatically operated to open said shunt circuit and to short circuit said resistance when said controlling member is in a predetermined position.

4. The combination with a motor, of an armature resistance controlling device, and a field resistance controlling device, a main switch for the motor circuit, and means for maintaining said main switch closed upon the stopping of the motor, until said field resistance device removes all the field resistance from the field circuit.

5. In a motor controlling system, the combination with an armature resistance, an automatically operated controlling member therefor, a field resistance, an automatically operated controlling member therefor, an automatically operated main switch, means insuring the removal of said field resistance from circuit prior to the insertion of said armature resistance in circuit and means for maintaining said main switch closed until the motor speed has been reduced to a predetermined degree.

6. The combination with a motor, of an armature resistance, an electro-responsive device for controlling said resistance, a field resistance, an electro-responsive device for controlling said field resistance, and means for maintaining the circuit through said armature resistance electro-responsive device in stopping the motor, until after the field resistance has been removed from circuit.

7. In a motor controlling system, the combination with an armature resistance, of a field resistance, an electromagnetically operated controlling member for each of said resistances, an electromagnetically operated main switch, a pressure operated switch adapted, in one position, to cause said main switch to be closed and said controlling members to be operated, and in another position to cause the removal of said field resistance from circuit and means for maintaining said main switch closed until a predetermined amount of said field resistance has been removed from circuit.

8. In a motor controlling system, the combination with an armature resistance, of a field resistance, an electromagnetically operated controlling member for each of said resistances, an electromagnetically operated main switch, a pressure operated switch adapted, in one position, to cause said main switch to be closed and said controlling member to be operated, and in another position to cause the removal of said field resistance from circuit, means for maintaining said main switch closed until said field resistance is removed from circuit and means necessitating the insertion of said armature resistance in circuit prior to the closure of said main switch.

9. In a motor controlling system, the combination with an armature resistance, of a field resistance, a controlling member for each of said resistances, an operating winding for each of said controlling members, a main switch, an operating winding therefor, means operated upon the closure of said main switch for energizing the winding of the armature resistance controlling member, means automatically operated upon the insertion of said armature resistance in circuit for energizing the winding of the field resistance controlling member, a pressure operated switch adapted, in one position to energize the operating winding of said main switch and in another position to deënergize the operating winding of said field resistance controlling element, a circuit for maintaining the winding of said main switch energized until the field resistance is removed from circuit and means necessitating the insertion of the starting resistance prior to the closure of said main switch.

In witness whereof, I have hereunto subscribed my name in the presence of two witnesses.

CLARK T. HENDERSON.

Witnesses:
T. E. BARNUM,
L. D. ROWELL.